United States Patent [19]

Frola

[11] Patent Number: 4,540,845

[45] Date of Patent: Sep. 10, 1985

[54] METHOD AND COMPOSITION FOR PROTECTING AN ELECTRICAL GROUNDING DEVICE

[76] Inventor: Pasquale Frola, Via Alcide Cervi, 41, Naples, Italy

[21] Appl. No.: 600,927

[22] Filed: Apr. 16, 1984

[51] Int. Cl.[3] ........................ H01R 4/66; C23F 11/00; C09K 15/02

[52] U.S. Cl. .................................... 174/7; 106/14.21; 405/263; 422/7; 501/71; 501/128

[58] Field of Search ......... 174/6, 7; 138/105, DIG. 6; 405/157, 263; 106/14.21, 900; 501/71, 128; 422/7, 18

[56] References Cited

U.S. PATENT DOCUMENTS 1,976,919 10/1934 Byrne ..................................... 174/7

2,007,969 7/1935 Grodsky ............................. 405/157

3,192,720 7/1965 Schaschl et al. .................... 405/263

FOREIGN PATENT DOCUMENTS 262061 7/1927 United Kingdom .................... 174/6

893919 1/1982 U.S.S.R. ................................ 501/71

*Primary Examiner*—Laramie E. Askin

*Attorney, Agent, or Firm*—Joseph C. Mason, Jr.

[57] ABSTRACT

Method and composition for protecting an electrical grounding device having a generally vertically disposed metal tubular electrode buried in the ground. Near the lower end of the tube, slots are provided in the sidewalls through which a special viscous fluid composition is injected into the surrounding soil to fix the tube in place and provide electrical contact with the earth. The composition surrounds and prevents excessive corrosion of buried metallic bodies and particularly those metallic bodies which are intended to provide electrical contact with the earth. The composition surrounding the metallic body contains primarily metallic oxides such as silicon dioxide. The oxidation activity of the metallic component should have a single electrode potential (standard or formal) at 25° C. of from −0.4 to −2.90. The composition may also contain other metallic oxides in admixture with the primary oxide. These metallic oxide components tend to prevent, or at least minimize, the percolation of ground water, with its accompanying corrosive salts, back to the tubular metal electrode. Accordingly, the useful life of the metal electrode is greatly extended.

6 Claims, 2 Drawing Figures

METHOD AND COMPOSITION FOR PROTECTING AN ELECTRICAL GROUNDING DEVICE

The device used in the invention provides good electrical ground contact and at the same time is relatively resistant to corrosive conditions when treated with the composition of the invention. The device is formed of stainless steel or galvanized iron tubing. The tubing may be provided with a point to permit direct driving into the soil or may be inserted into a previously formed hole. The tubing is provided with slots near the lower end and a filling material is introduced under pressure into the upper end thereof, which penetrates through the slots to fill the interstices of surrounding soil to protect the grounding tube from corrosive influences and at the same time provide good electrical grounding contact.

A common requirement for electrical installations is that of providing a dependable constant ground potential by the use of a grounding device capable of dispersing into the earth electrical currents which would tend to disturb the constant ground potential.

Similar grounding devices may be required for providing an assured path to the ground of dangerous electrical charges which may result from insulation failure or other equipment failure.

The usual grounding device may be constituted by one or more metallic bodies placed underground with metallic conductors connected thereto and extending out of the ground to the equipment connected thereto and extending out of the ground to the equipment to be protected. Such underground electrodes are frequently subject to rather rapid corrosion due to environmental corrosive influences or to electrochemical phenomena. Such corrosion leads to unreliable protection of the equipment which is provided with the ground and to excessive replacement costs.

Previous attempts to avoid these problems have included utilization of salt-containing filler materials to occupy the space between the grounding electrode and the surrounding earth and even the use of a carbonaceous paste of carbon black and water injected through a perforated conductive pipe into the surrounding soil.

These attempts have certainly improved the efficiency of the electrical ground, but have not sufficiently provided for the corrosion problem since water soluble corrosive salts from the soil are free to filter back through the carbon black and attack the metal electrode.

Another purpose of the invention is to provide a composition which is more effective in surrounding and protecting from corrosion buried metallic elements, particularly grounding elements for metallic bodies, than those presently available. Prevention of excessive oxidation and corrosion of the buried metallic elements is enhanced by the use of the enveloping compositions, as disclosed below. It is understood that such oxidation and corrosion may occur as a result of oxidizing components present in the ground or as a result of stray galvanic currents present in the environment.

Buried metallic pipelines carrying water or other fluids are subject to rather rapid corrosion and require constant attention to assure that their grounding implants remain effective. Grounding implants for electrical apparatus are especially susceptible to those corrosive influences. The corrosive influences along buried pipelines may vary widely from place to place.

An object of the present invention is to provide a good electrical ground and at the same time practically eliminate the corrosion problem.

According to the invention the ground device is constituted by a conductive tube of galvanized iron or stainless steel, the lower end of the tube being provided with side holes through which a special composition is injected into the soil under suitable pressure to flow out and into adjacent soil to occupy the interstices therein. The composition provides good grounding and also corrosion protection within and without the metallic tube. This special composition is that disclosed hereinbelow. The composition has the ability to inhibit the percolation of ground water and accompanying soluble salts.

The invention will be understood from the more detailed description which follows with reference to the drawings in which.

Figure 1:
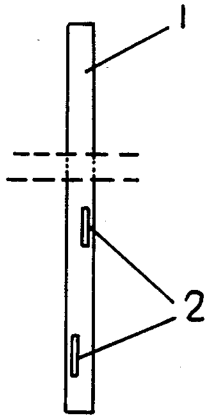
FIG. 1 is a diagrammatic elevation of the tubular electrode with dispersing slots.
Figure 2:
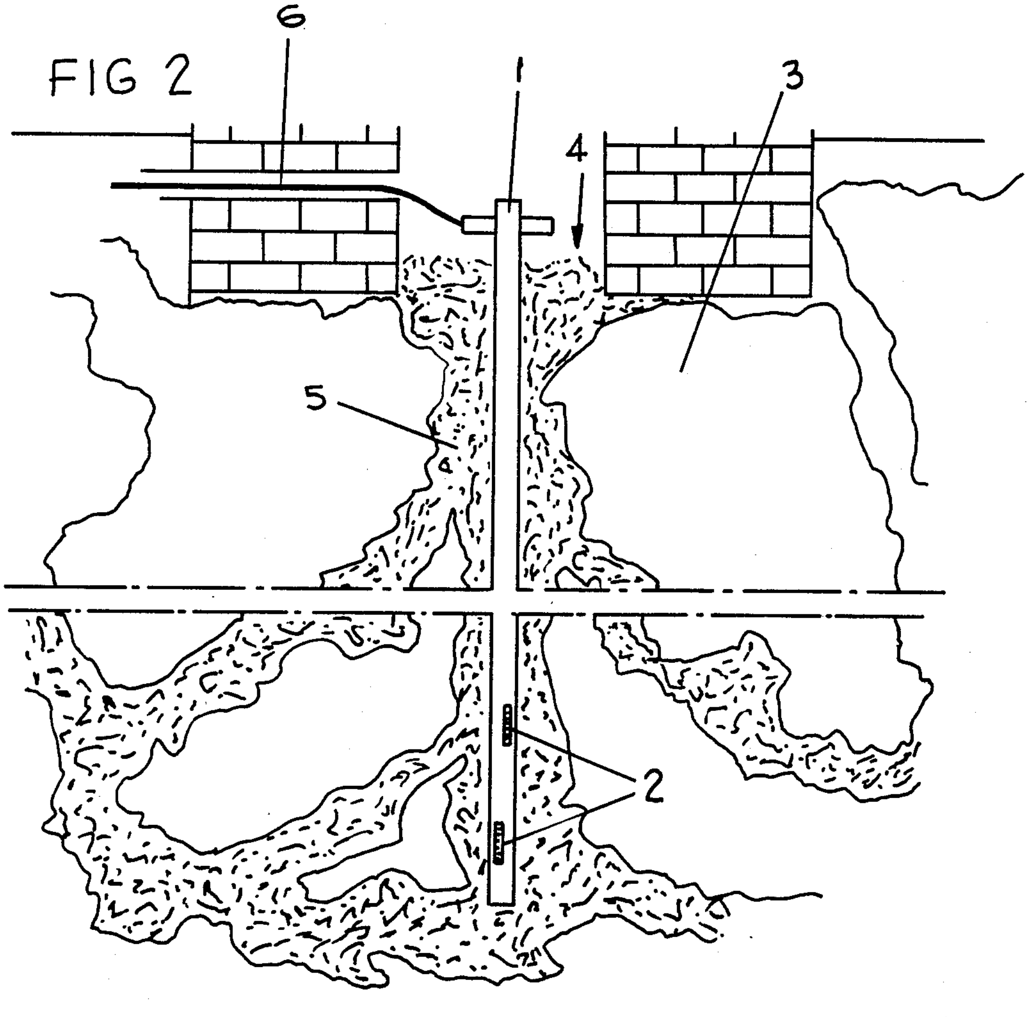
FIG. 2 is a diagrammatic elevation of the grounding device as it would appear after insertion into the earth.

With reference to the drawings, the dispersing unit is formed from a metal tube 1, which is preferably made of stainless steel or of galvanized iron. The lower end of the tube 1 is provided with slots or holes 2 passing through the sidewalls thereof.

In the illustrated form a hole 4 is drilled into the ground 3 which is of suitably larger diameter than the tube 1 and of a depth to accommodate most, but not all, of the tube. The following material 5 as an example of the inventive composition is then introduced under pressure through the top of the tube:

| Component | Standard or Formal Potential @ 25° C. | Percentage by Weight |
|---|---|---|
| $SiO_2$ | −0.86 | 61 |
| $Al_2O_3$ | −1.66 | 15 |
| $Fe_2O_3$ | −0.44 | 13 |
| CaO | −2.87 | 5 |
| MgO | −2.69 | 3 |
| $Mn_2O_3$ | −1.17 | 0.5 |
| ZnO | −1.216 | 0.7 |
| $Cr_2O_3$ | −0.74 | 1.0 |
| $TiO_2$ | −0.86 | .8 |
| | | 100.00 |

This material exits the tube through slots or holes 2 filling the gap between the hole 4 and the tube 1 and branching out into the cavities of the surrounding soil 3 as shown.

By means of the pressure injected metallic oxide material, a barrier is provided which substantially prevents or impedes the migration of oxygen or oxidizing agents from the soil to the surfaces of the metal tubular electrode.

The filling material 5 not only provides good electrical contact for implants in the ground but reduces corrosion of the implants themselves.

The new composition comprises metallic oxides wherein such oxide is not oxidized as easily as hydrogen. Therefore, in considering the total emf of a cell, e.g., $$E_{cell}=E_{ox}+E_{red}$$

which is the sum of the two "single electrode potentials", $E_{ox}$ is the single electrode potential of the electrode forming the negative pole of the cell, and $E_{red}$ is the single electrode potential of the electrode forming the positive pole of the cell. Preferred substances of this invention are not as easily oxidized as hydrogen, and therefore, its $E_{ox}$ is negative and $E_{red}$ is positive in sign.

The preferred metallic oxides are the oxides of silicon ($SiO_2$), aluminium ($Al_2O_3$), iron ($Fe_2O_3$), calcium ($CaO$), magnesium ($MgO$), manganese ($Mn_2O_3$), zinc ($ZnO$), chromium ($Cr_2O_3$), and titanium ($TiO_2$), admixed as set forth in the example of the material 5 given above or in the two examples set forth hereinbelow. Therefore, the oxidation activity of the metallic components of the novel composition should have a single electrode potential (standard or formal) at 25° C. of from −0.4 to −2.90.

It is distinctly preferred that the composition comprise silicon dioxide as its major component.

Another composition comprises:

| Component | Percent by Weight |
|---|---|
| $SiO_2$ | 68 |
| $Al_2O_3$ | 17 |
| $Fe_2O_3$ | 15 |
| | 100 |

A still further composition comprises:

| Component | Percentage by Weight |
|---|---|
| $SiO_2$ | 64 |
| $Al_2O_3$ | 16 |
| $Fe_2O_3$ | 14 |
| $CaO$ | 6 |
| | 100 |

Each of these compositions provided corrosion protection for electrical grounding devices without replacement, for times exceeding one (1) year, whereas unprotected grounding devices had to be replaced in a matter of a few months in the same earth environment.

The oxides of manganese and/or magnesium may be added to the above compositions in minor amounts, ranging from 0.2% by weight to 3.0% by weight of the total composition with good results.

These components may be mixed in the above proportions with sufficient water to form a viscous fluid for easy application and applied so as to entirely cover the metal body to be protected. Preferably, sufficient water is used so that the composition filters into the interstices of the surrounding ground and is sufficient to provide for soaking into the ground and consolidation around the metallic body to be protected, whether it is intended to act as an electrically conducting medium or only as a barrier against oxidation of a metallic ground device. As used herein, the term "water" is intended to include any aqueous carrier material.

It has been found that electrical grounds protected as described last in terms of years, rather than months, when the grounding element is buried directly in corrosive earth conditions.

It is well known that buried metallic conductors, whether they be for fluids or electric current, are subject to attack by atmospheric agents and corrosive substances in the ground. The covering of a conductor, such as a pipeline, in the manner indicated, makes such a conductor practically indifferent to ground conditions and thus from rapid corrosion, with much savings in maintenance costs.

Obviously, materials may be added to the composition for purposes such as to provide greater cohesion to the ground or to improve dispersion.

It is very important that the filling material be injected in sufficient amounts to line the hole around the tube 1 so that no unfilled cavities remain and that the soil cavities surrounding the hole are well filled.

In very friable soils a point-end dispersing unit 1 may be driven into the ground with equally good results. With friable soils the filling material will bind the adjacent soil and at the same time create adhesion to the dispersing tube 1. In addition, the tube 1 may be connected by means of a suitable cable 6 with the installation to be grounded.

What is claimed is:

1. The method of providing corrosion protection for an electrical grounding device of the type which comprises a tubular metallic grounding electrode located in the earth and having small openings in the lower end thereof; comprising, injecting a viscous anticorrosive material into said tubular electrode under pressure sufficient to extrude said material through said openings into the surrounding earth to substantially fill the interstices between said tube and the adjacent earth, said anticorrosive material comprising an admixture of $SiO_2$, $Al_2O_3$ and $Fe_2O_3$ with sufficient water to render the admixture viscous.

2. Method according to claim 1 wherein said admixture comprises more than 50% by weight silicon dioxide.

3. Method according to claim 2 wherein said admixture contains additionally the oxide of calcium.

4. Method according to claim 1 wherein the admixture contains at least 50% by weight $SiO_2$ and contains additionally $CaO$, $MgO$, $Mn_2O_3$, $ZnO$, $Cr_2O_3$ and $TiO_2$.

5. Method according to claim 4 in which the admixture comprises by weight 61% $SiO_2$, 15% $Al_2O_3$, 13% $Fe_2O_3$, 5% $CaO$, 3% $MgO$, 0.5% $Mn_2O_3$, 0.7% $ZnO$, 1.0% $Cr_2O_3$ and 0.8% $TiO_2$.

6. A composition of matter for the protection of a buried electrical grounding device against corrosion, said composition comprising by weight about 61% $SiO_2$, 15% $Al_2O_3$, 13% $Fe_2O_3$, 5% $CaO$,3% $MgO$, 0.5% $Mn_2O_3$, 0.7% $ZnO$, 1.0% $Cr_2O_3$, and 0.8% $TiO_2$.

* * * * *